REVERSIBLE DIGITAL RESOLVER

Filed July 21, 1958 4 Sheets-Sheet 1

INVENTORS
DALE R. INGWERSON
RICHARD A. CARPENTIER
BY R. V. Craddock
ATTORNEY

Aug. 8, 1961 D. R. INGWERSON ET AL 2,995,302

REVERSIBLE DIGITAL RESOLVER

Filed July 21, 1958 4 Sheets-Sheet 2

INVENTORS
DALE R. INGWERSON
RICHARD A. CARPENTIER
BY
ATTORNEY

INVENTORS
DALE R. INGWERSON
RICHARD A. CARPENTIER
BY
R. J. Craddock
ATTORNEY

INVENTORS
DALE R. INGWERSON
RICHARD A. CARPENTIER
BY R. J. Craddock
ATTORNEY

United States Patent Office 2,995,302

Patented Aug. 8, 1961

2,995,302

REVERSIBLE DIGITAL RESOLVER

Dale R. Ingwerson, Santa Clara, Calif., and Richard A. Carpentier, Charlottesville, Va., assignors to Sperry Rand Corporation, a corporation of Delaware Filed July 21, 1958, Ser. No. 749,695
4 Claims. (Cl. 235—152)

The invention relates generally to digital computers and, more particularly, is concerned with such a computer for reducing input information representing the magnitude and direction of a vector into two orthogonal components, the components being represented by binary digital signals.

Many devices have been proposed in the art for purposes of resolving input data representing the magnitude and direction of a vector into two components at right angles to each other representing the projection of the input vector on two predetermined orthogonally positioned axes. For example, it is well known that an electromechanical resolver is adapted to receive an input alternating signal and operative to produce two output signals having the same phase as that of the input signal but having amplitudes proportional to the sine and cosine of the angle of the displacement of the resolver rotor, relative to some reference position, multiplied by the amplitude of the input signal. Such a device has the structural simplicity of analog apparatus but also has the inherent disadvantage of restricted precision. That is, the maximum angular resolution of the illustrative electromechanical resolver is limited to some percentage of one complete revolution of the resolver stator.

There are many applications, however, where it is desirable to increase the resolution properties of a resolver. For such precision applications the use of digital techniques makes feasible a substantial increase in resolution. Digital resolvers have been proposed for purposes of reducing input data representing a vector into two perpendicular components of high precision. As is the case with most digital computers, however, an appreciable increase in complexity is necessary over the comparable analog mechanism. Additionally, in the case of a digital resolver, unless special provision is made, the resolver is not entirely reversible for the reason that an inherent error in the resolved components occurs upon a reversal of sense of the input data, which error is cumulative upon subsequent additional reversals.

It is the general object of the present invention to pro-provide a digital resolver adapted to incorporate a minimum of components.

Another object is to provide a digital resolver adapted to respond to a reversal of the sense of input information without producing cumulative error.

An additional object is to provide an improved computer adapted to receive input information representing the magnitude and direction of the vector and operative to reduce said input information into two orthogonal components, the components being available in the form of binary digital data.

A further object is to provide an improved binary digital resolver for continuously converting incremental input shaft displacements into sine and cosine coordinates.

These and other objects, as will become more apparent from a reading of the following specification, are achieved in an illustrative embodiment of the invention by the provision of a binary digital resolver for converting the angular position of an input shaft into serial binary output signals proportional to the sine and cosine of the input shaft angle. The illustrative embodiment incorporates serial methods of computation and time-sharing techniques in order to reduce the number of components required for its construction. In essence, the invention contemplates the use of two binary digital integrators adapted to receive input pulse informtaion representing incremental changes in the angular displacement of a shaft, and operative to produce serial output digital data representing the sine and cosine of the angle of said displacement. Each of the digital integrators effectively incorporates two digital data storage devices, thus necessitating a total of four such storage devices for the complete resolver. By means of time-sharing a single storage means in the form of a recirculating delay loop, the function of all four storage means is performed by one.

Of the four effective storage means, two are used to store the computed sine and cosine information. The number in each storage device or accumulator recirculates through a delay loop and changes only when an input pulse is received. Each input pulse is multiplied by each digit of the number stored in the sine and cosine accumulators and the resultant product is integrated in respectively associated additional accumulators, one additional accumulator being associated with the sine and the other being associated with the cosine. When the capacity of the sine additional accumulator is exceeded, the resulting overflow is directed to the cosine storage means. Similarly, when the capacity of the cosine additional accumulator is exceeded, the overflow is directed to the sine storage means. Each of the accumulators are adapted to integrate in either of two senses. For first quadrant input angles, for example, the sine accumulator and cosine additional accumulator integrate in a forward sense while the cosine accumulator and sine additional accumulator integrate in an opposite sense, assuming that the input angular displacement information is varying from 0° to 90°.

A zero detector determines when either the sine or cosine goes to zero, i.e., when a quadrant boundary is traversed, to reverse the sense of operation of the integrators. Thus, for example, when the sine accumulator is full, it reverses direction and a further angular displacement of the input shaft information causes the maximum number stored in the sine accumulator to return toward zero. Additionally, a reversal of the sense of input shaft displacement information also causes the integrators to reverse allowing for the operation of the resolver of the present invention in a backward as well as forward direction. By means of selectively crossfeeding the overflow signals of each additional accumulator to the least significant digit place of the other additional accumulator, cumulative errors are obviated which would otherwise be produced upon reversals of the sense of input information.

For a more complete understanding of the present invention, reference should be had to the following specification and the appended drawings of which:

FIG. 6 is an illustrative embodiment of the polarity converter of FIG. 4; and

Figure 1:
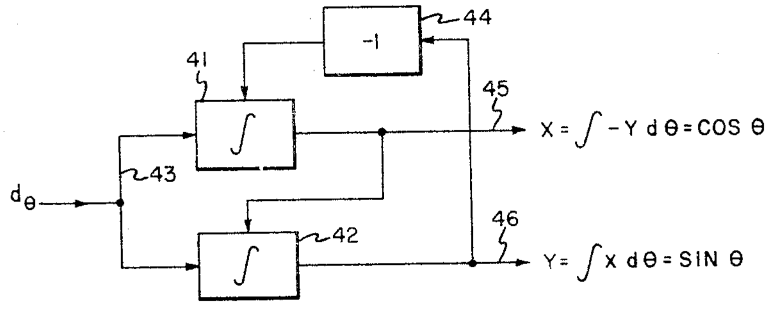
FIG. 1 is a functional block diagram of a resolver utilizing a pair of crossconnected integrators.

The basic resolver of FIG. 1 incorporates two integrators generally designated by the numerals 41 and 42. The resolver is adapted to receive input information, representing differential changes $d\theta$ in an angle $\theta$, which is simultaneously applied via line 43 to first inputs of integrators 41 and 42. The output of integrator 42 is applied via inverter 44 to a second input of integrator 41. The output of integrator 41 is directly applied to a second input of integrator 42.

The operation of the apparatus of FIG. 1 to resolve the integral of the differential angular input information into the sine and cosine of the total angle can be shown in the following manner. Let it be assumed that the output of integrator 41, on line 45, is designated $x$ while the output of integrator 42, on line 46, is designated $y$. It is further assumed that integrators 41 and 42, respectively, operate to integrate the product of the two signals applied thereto.

Thus, $$x=\int -y\,d\theta \quad (1)$$

and $$y=\int x\,d\theta \quad (2)$$

Differentiating (1), there results $$\frac{dx}{d\theta}+y=0 \quad (3)$$

Differentiating (2), there results $$\frac{dy}{d\theta}-x=0 \quad (4)$$

Differentiating (3), there results $$\frac{d^2x}{d\theta^2}+\frac{dy}{d\theta}=0 \quad (5)$$

Substituting (4) into (5), there results $$\frac{d^2x}{d\theta^2}+x=0 \quad (6)$$

Differentiating (4), there results $$\frac{d^2y}{d\theta^2}-\frac{dx}{d\theta}=0 \quad (7)$$

Substituting (3) into (7), there results $$\frac{d^2y}{d\theta^2}+y=0 \quad (8)$$

As is well known, Equations 6 and 8 represent simple harmonic motions whose roots, respectively, are $$x=A\cos(\theta+\phi)$$

and $$y=A\sin(\theta-\phi)$$

By proper adjustment of initial boundary conditions, A may be made equal to unity and $\phi$ may be made equal to zero. Thus $$x=\cos\theta$$

and $$y=\sin\theta$$

Figure 2:
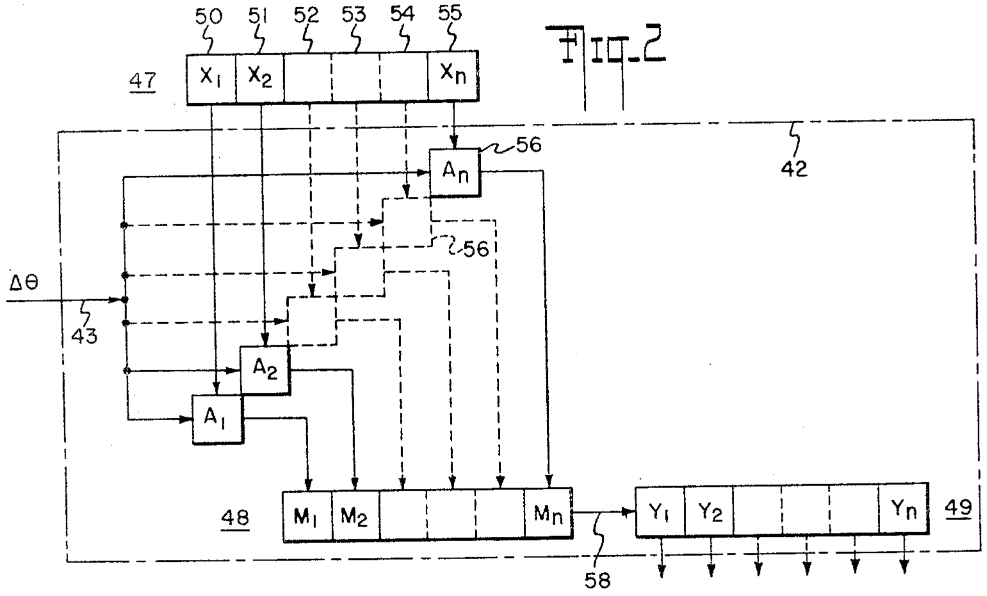
FIG. 2 is a functional block diagram of a digital integrator.

FIG. 2 illustrates in functional block form a digital integrator which may be used as either integrator 41 or 42 of FIG. 1. The principle of integration utilized in FIG. 2 is based upon summing the areas of all the small rectangles in an interval of $\theta$ whose width is $\Delta\theta$ and whose height is $x$. As close an approximation as is desired to an integration process can be obtained by making the increments $\Delta\theta$ arbitrarily small.

In FIG. 2, three binary registers are designated by the numerals 47, 48, and 49. Cosine register 47 contains in respective stages 50, 51, 52, 53, 54 and 55, the digits of a number $x$ such as appears on line 45 of FIG. 1. Each of said stages is connected to a first input of a respectively associated AND gate 56, a second input to each of which is jointly derived from line 43 on which the $\Delta\theta$ information appears. Said $\Delta\theta$ information is represented by pulses, one pulse appearing each time the input $\theta$ information changes an incremental amount $\Delta\theta$. The output of each AND gate is applied to a respective stage of cosine additional register 48. Thus, each time a $\Delta\theta$ pulse occurs, the number stored in register 47 is transferred to register 48. When the capacity of register 48 is exceeded, an overflow signal on lead 58 is applied to the least significant digit place of sine register 49. It can be shown that the number stored in register 49 after $p$ input pulses as applied via lead 43 will be equal to $$\frac{1}{2n}\sum_{0}^{p}X\Delta\theta$$

As $\Delta\theta$ approaches zero, $\Sigma X\Delta\theta$ becomes substantially equal to $\int x\,d\theta$.

Figure 3:
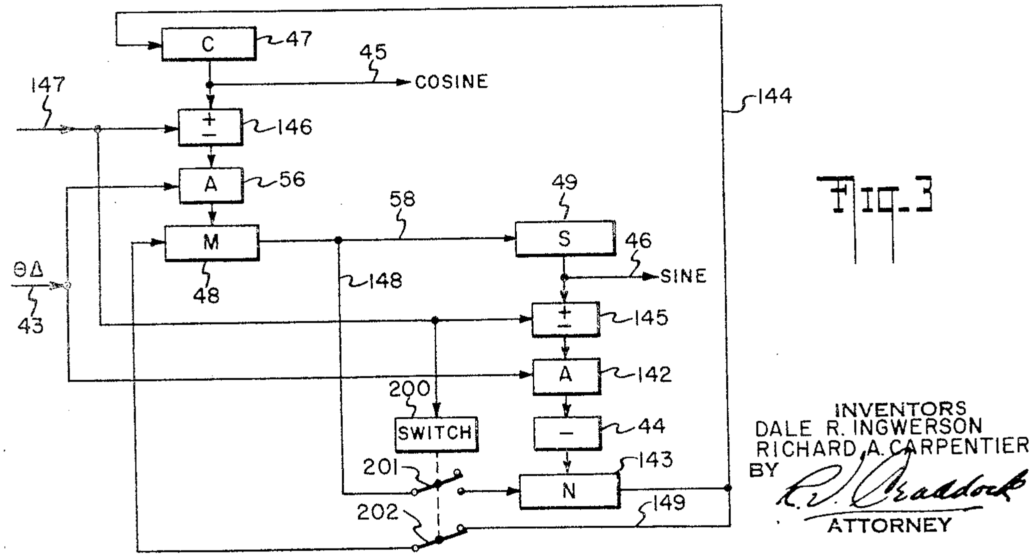
FIG. 3 is a simplified block diagram illustrating the principles of operation of the present invention.

FIG. 3 is a simplified block diagram which illustrates the principles of operation of the present invention. It will be seen that FIG. 3 in part results from the substitution of the digital integrator of FIG. 2 into the functional block diagram of the resolver of FIG. 1. The components represented in FIG. 3 have been numbered in accordance with the corresponding components of FIGS. 1 and 2.

The digital integrator of FIG. 2 is represented by the cosine register 47, AND gate 56, M register 48, lead 58, and sine register 49. Although a single AND gate 56 is shown in FIG. 3, it should be understood that it represents the plurality of AND gates 56 of FIG. 2, each of which respectively interconnects a corresponding digital place of the cosine and M registers, respectively. To complete the basic structure of FIG. 1, AND gate 142, inverter 44, N register 143, and lead 144 have been added. The digital integrator comprising sine register 49, AND gate 142, N register 143 and cosine register 47 is identical in structure and operation to the digital integrator of FIG. 2. Inverter 44 of FIG. 3 represents inverter 44 of FIG. 1. Cosine output lead 45 and sine output lead 46 correspond to the identically designated output leads of FIG. 1.

In addition, provision is made in FIG. 3 for reversing the sense of integration of all four of the cosine, M, sine, and N registers. These means are generally designated by the numerals 145 and 146. When a control signal is applied to lead 147, sense reversing means 145 and 146 are simultaneously placed into predetermined conditions depending on the quadrant in which the angle $\theta$ lies and the sense in which the angle $\theta$ is incrementally changing. The manner in which the control signal is produced will be described later in connection with the preferred embodiment of the present invention shown in FIG. 4.

It will now be shown that upon a reversal of the sense of the $\Delta\theta$ increment signal, cumulative errors arise in the values of the numbers stored in the sine and cosine registers. The signal representing the $\Delta\theta$ increment is applied via lead 43 simultaneously to AND gates 56 and 142. Each time that a signal representing an incremental change $\Delta\theta$ is applied via lead 43, the number then existing in cosine register 47 is added to the then existing number contained in M register 48, assuming a positive $\Delta\theta$ increment in the first quadrant, for example. At the same time, the number then existing in the sine register 49 is subtracted from the number then existing in the N register 143.

The addition of the cosine number to the M register may cause the M register to overflow, in turn increasing by one least significant digit the number stored in sine register 49. Similarly, the subtraction of the sine number from the number stored in the N register 143 may cause the N register to overflow negatively, in turn decreasing by one least significant digit the number stored in cosine register 47. Thus, the number stored in sine register 49 represents the number of times that M register 48 has overflowed, which is substantially equal to the integral of $Xd\theta$ (X representing the value of the cosine) and Equation 2 is adhered to.

Let it be assumed, for purposes of illustration, that a $\Delta\theta$ signal is applied via lead 43 which results in the overflow of M register 48 and the consequent increase in the least significant digit of the sine number stored in register 49. Let $S_n$, $C_n$, $N_n$, and $M_n$ represent the values of the numbers in the S, C, N, and M registers pre-existing the occurrence of said signal. Similarly, let $S_{n+1}$, $C_{1+1}$, and $M_{n+1}$ signify the corresponding numbers following the occurrence of said $\Delta\theta$ signal.

Should a reversal in the sense of the $\Delta\theta$ signal now take place (as evidenced by the control signal applied to lead 147), the value of $S_{n+1}$, for example, will revert to its pre-existing value $S_n$ upon the sole condition that the value of $M_{n+1}$ be reduced by the same number ($C_n$) which previously was added to $M_n$ to produce $S_{n+1}$. It will be noted, however, that the number $C_n$ to be subtracted from the number $M_{n+1}$ so as to recreate the number $S_n$ is no longer available at the stated time of reversal. Thus, upon a reversal of a sense of the $\Delta\theta$ signal, an erroneous reduction in the value of $M_{n+1}$will take place with the consequence that $S_{n+1}$ will not revert to its pre-existing value $S_n$.

In brief, because of the fact that the values of the numbers $S_n$, $C_n$, $N_n$, and $M_n$ immediately preceding the value of the number $S_{n+1}$, $C_{n+1}$, $N_n$ and $M_{n+1}$ at the moment of reversal are no longer available in the respective registers, the basic digita resolver of FIG. 3 is incapable of repeating the same incremental value of sine and cosine (contained in registers 49 and 47 respectively) which pre-existed the time of reversal. The present invention involves the utilization of contemporaneous signals representing the numbers contained in the S, C, N, and M registers at the time of reversal so as to recreate the appropriate prior value thereof in order to accomplish a reversal without the introduction of errors attributable to said reversal.

The reversal errors are eliminated, according to the present invention, by the introduction of leads 148 and 149 and switch 200 which selectively apply the output overflow signal from M register 48 to the least significant digit place of N register 143 and to selectively apply the output overflow signal from N register 143 to the least significant digit place of M register 48. The operation of switch 200 and its associated switching members 201 and 202 is controlled by the same sense reversing signal appearing on lead 147 which governs the operation of sense reversing means 145 and 146.

The elimination of the reversal error may be demonstrated as follows. As previously discussed, the value of $S_{n+1}$ will revert to its pre-existing value $S_n$ upon the sole condition that $M_{n+1}$ be reduced by the same number $C_n$ which previously was added to $M_n$ to produce $S_{n+1}$. It was further noted that the number $C_n$ to be subtracted from the number $M_{n+1}$ is not available at the time when the stated subtraction is to take place. Instead, the number $C_{n+1}$ may be subtracted from the number $M_{n+1}$ inasmuch as said two numbers exist contemporaneously.

The number $C_{n+1}$ will differ from the number $C_n$ (which actually should be used for subtraction) only by one least significant digit in the event that the N register 143 had overflowed (positively) during the reversal interval between the establishment of the $C_n$ and $C_{n+1}$ numbers. If such an overflow had occurred, then the number $C_{n+1}$ is one least significant digit larger than the number $C_n$. Therefore, when the number $C_{n+1}$ is subtracted from the number $M_{n+1}$, the resulting number is the M register is erroneously smaller than it would have been if the correct smaller number $C_n$ had been used instead. In this case, the output overflow signal from N register 143 is applied via lead 149 and closed switching member 202 to the least significant digit place of M register 48 so as to increase the number stored therein by one least significant digit. Thus, the resulting number stored in M register 48 as a consequence of subtracting $C_{n+1}$ from $N_{n+1}$ is increased by the overflow signal from the N register 143 to precisely the value that would have resulted if $C_n$ had been subtracted from $M_{n+1}$.

Figure 4:
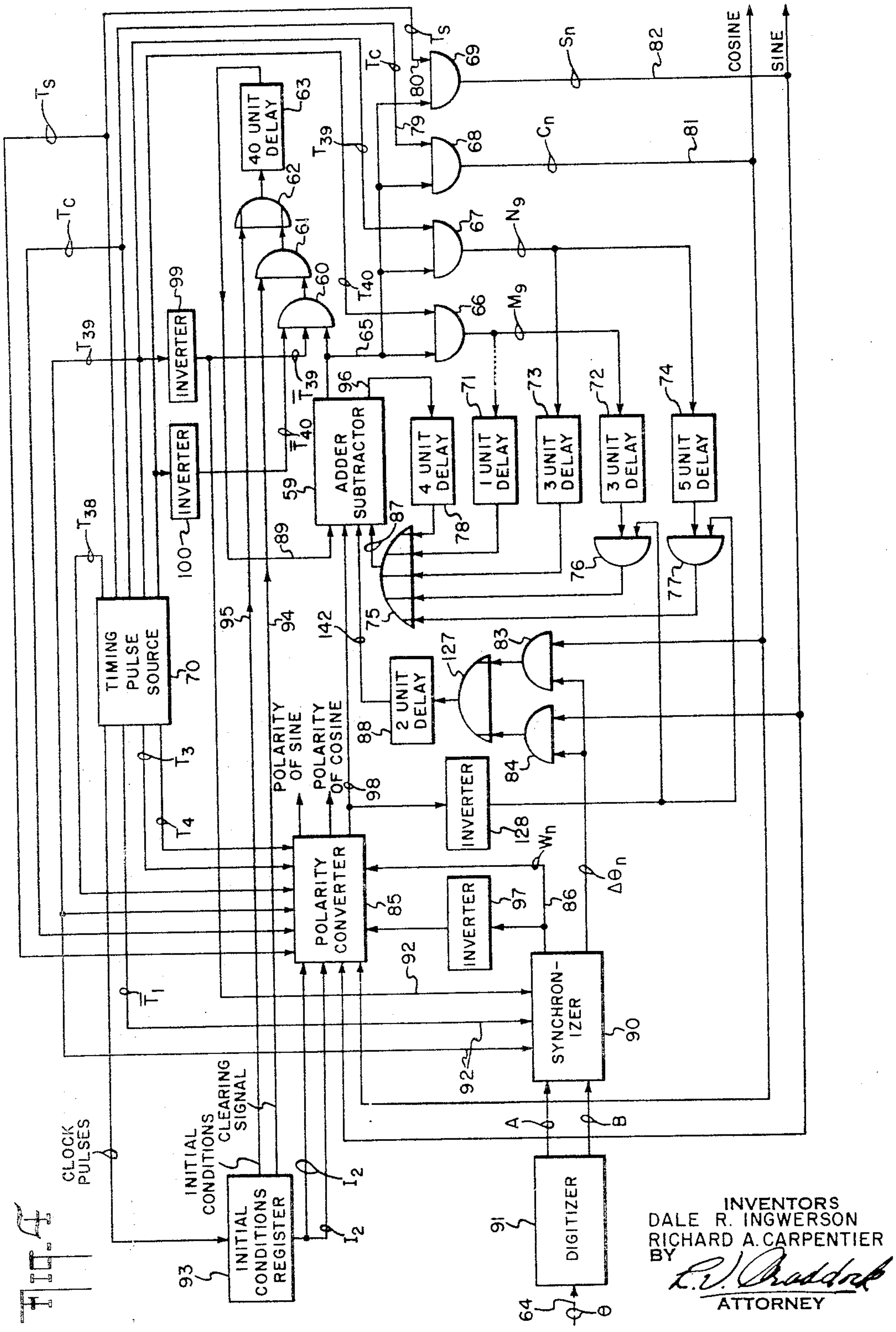
FIG. 4 is a simplified block diagram of a preferred embodiment of the present invention.
Figure 5:
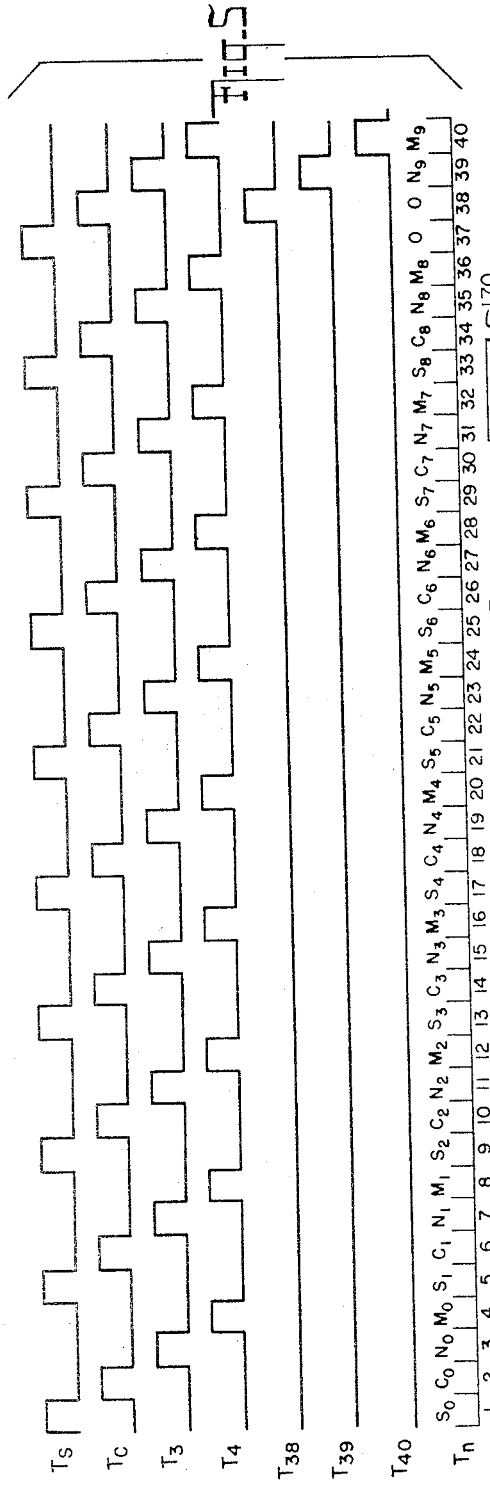
FIG. 5 is a series of waveforms useful in explaining the operation of the embodiment of FIG. 4.

In the preferred embodiment of the present invention disclosed in FIG. 4, the function of a total of four registers comprising integrators 41 and 42 of FIG. 1 is performed by a common time-shared recirculating delay loop. The recirculating delay loop path in FIG. 4 comprises adder-subtractor 59, AND gate 60, AND gate 61, OR gate 62, forty unit delay 63 and line 89. Timing diagram $T_n$ of FIG. 5 illustrates the time sequence of the individual digits comprising the four words stored in the equivalent four registers each respectively representing the values of sine, cosine, N, and M. The timing diagram represents one complete cycle around the recirculating delay loop of the aforementioned four words, each of which is comprised of nine digits (0–8), for example.

As will be more fully explained in the following, the initial values of N and M are so chosen in the apparatus of FIG. 4 that the values of sine and cosine vary from zero to unity for a one quadrant angular displacement of input shaft 64. Values of unity for sine and cosine are represented by the presence of binary "ones" in each of the respective digits $S_0$ through $S_8$ and $C_0$ through $C_8$ respectively. When the initial values of S, C, N, and M are properly adjusted, the values of the binary numbers appearing in the S, C, N, and M registers will recycle after each quadrant of continuous angular displacement of input shaft 64.

For purposes of minimizing the apparatus required in the preferred embodiment of the present invention, serial digital techniques are employed rather than the parallel techniques illustrated in integrator 42 of FIG. 2. By such serial techniques it is possible to employ a common recirculating delay loop to perform the functions of each of the four registers comprising integrators 41 and 42 of the resolver of FIG. 1. The recirculating delay loop is tapped at the location of the output of adder-subtracter 59 by lead 65. Lead 65 is connected to first inputs of AND gates 66, 67, 68, and 69. Second inputs to AND gates 66, 67, 68, and 69 are derived from respective outputs of timing pulse source 70. The output of AND gate 66 is jointly connected to the inputs of one unit delay 71 and three unit delay 72. The output of AND gate 67 is jointly connected to the inputs of three unit delay 73 and five unit delay 74. The outputs of delays 71 and 73 are applied to multiple input OR gate 75. The outputs of delays 72 and 74 are respectively connected to first inputs of AND gates 76 and 77 whose outputs in turn are also connected to multiple input OR gate 75. In the operation of adder-subtracter 59, carry or borrow signals may be generated from time to time and these are applied via line 96 and four unit delay 78 to another input of multiple input OR circuit 75.

Full adder-subtracter 59 may be of conventional design. It is adapted to receive simultaneously three input serial digital signals on leads 142, 87 and 89 and is operative to add or subtract said serial digital signals in response to a control signal applied via lead 98. By reference to timing diagram $T_n$ of FIG. 5, it will be seen that if, for example, a carry signal is produced by the addition of a signal to the least significant digit $S_0$ of the sine word appearing in time interval 1, the carry, after being delayed four time intervals will be added to the next least significant digit $S_1$ of the sine word appearing in time interval 5.

The signal appearing on line 79 at the input of AND gate 68 is shown in the waveform $T_c$ of FIG. 5. The signal appearing on line 80 at the input of AND gate 69 is represented by waveform $T_s$ of FIG. 4. It will be noted that the idealized pulses of waveforms $T_s$ and $T_c$, respectively, occur in synchronism with the time of occurrence of the digits of the sine and cosine words as said digits appear in time at the output of adder-subtracter 59. The signal appearing on leads 81 and 82 at the outputs of AND gates 68 and 69 represent, respectively, the values of the cosine and sine of the total angle through which input shaft 64 has been rotated. The signals on leads 81 and 82 are respectively connected to first inputs of AND gates 83 and 84 and to first inputs of polarity converter 85. The outputs of AND gates 83 and 84 are coupled by means of OR gate 127 and two unit delay 88 to an input of adder-subtracter 59.

The second inputs to AND gates 83 and 84 are commonly derived from a first output of synchronizer 90, which is, in turn, connected to the output of digitizer 91. Digitizer 91 is responsive to the rotation of input shaft 64 and is operative to produce one output pulse each time that shaft 64 has been displaced a predetermined angular amount represented by the increment $\Delta\theta$. The $\Delta\theta$ pulses, designated by the letter A, are applied to a first input to synchronizer 90. Synchronizer 90 produces output pulses synchronous with the clock pulses of source 70 in response to the $\Delta\theta$ pulses derived from the output of digitizer 91 and the timing waveforms $\overline{T}_1$, $T_{39}$ and $\overline{T}_{39}$ applied via leads 92.

Provision is made for the insertion of signals representing initial values of the numbers S, C, N, and M. Such provision includes initial conditions register 93, AND gate 61 and OR gate 62. A first output from register 93 is applied via lead 94 to a second input of AND gate 61. In the absence of a signal on lead 94, AND gate 61 is rendered non-conductive, thus disrupting the path of the recirculating delay loop. A second output signal from register 93 is applied via lead 95 to a second input of OR gate 62. The signals sequentially appearing on lead 95 represent the initial values of the numbers S, C, N, and M. The signal on lead 94 is interrupted during the interval that the signal representing the initial values is applied via lead 95 to OR gate 62.

In addition to the $\Delta\theta$ pulses, digitizer 91 also produces a second output signal whose phase, relative to that of the $\Delta\theta$ pulses, indicates that input shaft 64 is being displaced in a predetermined sense. The second output signal is designated by the letter B indicated at the output of digitzer 91 in FIG. 4. The B signal also is applied to synchronizer 90 in turn producing an output signal $W_n$ on lead 86 bearing a predetermined time relationship with respect to the clock pulses appearing on leads 92. The signal on lead 86 is applied to inverter 97 and to polarity converter 85. Inverter 97 produces an output signal $\overline{W}_n$ in the absence of a signal on lead 86 and no output signal in the presence of a signal on lead 86. The output of inverter 97 is connected to polarity converter 85.

Polarity converter 85 thus receives three pairs of input signals in addition to timing signals from source 70. The first pair emanates from initial conditions register 93; the second pair represents the values of the cosine and sine information on leads 81 and 82; the third pair comprises the $W_n$ and $\overline{W}_n$ signals. As will be seen more fully from the following description, polarity converter 85 responds to the aforesaid signals and produces three output signals, two of which represent the polarity sign of the sine and cosine information available on leads 81 and 82 while the third signal, appearing on lead 98, governs the additive and subtractive functions of adder-subtracter 59 and, through inverter 128, the conduction of gates 76 and 77.

In operation, it is assumed that the initial values of the four words S, C, N, and M have been inserted into the recirculating delay loop. As previously mentioned, the initial values are selected so as to cause the values of S, C, N, and M to recycle for each quadrant of continuous angular rotation of input shaft 64. For any chosen initial value for S and a corresponding value for C, there are matching values for N and M which will make the resolver operate correctly. The determination of proper values for N and M is facilitated by the fact that:

(1) If the value of M is too high, the cosine will go beyond 1 before the sine reaches 0, and (2) If N is too low, the sine will go beyond 0 before the cosine reaches 1.

When such values are inserted into the recirculating delay loop, the individual stages of sine register, represented by timing intervals 1, 5, 9, 13, 17, 21, 25, 29, and 33 of FIG. 5 will each contain a signal representing the binary value 1 when input shaft 64 has been displaced 90° relative to its reference position.

It will be seen that time position 37, however, will never assume any value other than zero inasmuch as the most significant digit $S_8$ of the number representing the sine could never overflow. Similarly, time position 38 will also always be zero for the reason that the maximum numerical capacity of the cosine register comprising time spaces 2, 6, 10, 14, 18, 22, 26, 30, and 34 will never be exceeded. In other words, time positions 1 to 40 inclusive may be occupied by signals representing the binary values 1 or 0, with the exception that time positions 37 and 38 always have a signal representing the binary value 0.

The time sequence of operation taking place in adder-subtracter 59 is as follows: Starting with the least significant digit, each digit contained in the sine and cosine registers is algebraically combined with its respectively associated digit in the N and M registers assuming that a $\Delta\theta_n$ pulse has been received. In terms of time-shared delay loop of the embodiment of FIG. 4, and by reference to diagram $T_n$ of FIG. 5, it can be seen that the above operations can be performed by delaying each respective digit of the sine and cosine words by two units of time, based on the forty-time units defining a complete cycle of operation. Thus, by delaying $S_0$, for example, by two time units, it may be added to its corresponding digit of the N register, $N_0$, and so on.

It will be seen by reference to diagram $T_n$ of FIG. 5, that the words contained in each of the four registers S, C, N, and M are each comprised of nine digits. As was previously mentioned, intervals 37 and 38 always contain a signal representing the binary value 0. Time intervals 39 and 40 respectively contain signals representing the overflow, if any, from the N and M registers, respectively, resulting from the repetitive process of adding the number contained in the cosine register, for example, to the preexisting number contained in the M register. When the total numerical capacity of the M register is exceeded, the most significant digit, $M_8$, of the M register will undergo a transition from the binary value 1 to the binary value 0 generating a carry signal which, when delayed four time units by delay 78, is placed in time interval 40. In other words, the presence of a signal representing the binary value 1 in either time interval 39 or 40 indicates that the respectively associated N and M registers have overflowed. In the operation of the present invention, the overflow signal from the M register ($M_9$) is added to the least significant digit of the sine number and the overflow from the N register ($N_9$) is subtracted from the least significant digit of the cosine number in the illustrative case of positive rotation of input shaft 64 in the first quadrant.

A complete statement of the operation of the Digital Resolver of FIG. 4, resulting from the selective interconnection between the N and M registers, is conveniently expressed in the following equations:

$$\left.\begin{array}{ll}(9)\ S_n=S_{n-1}+M'_{n9} & (11)\ M'_n=M_{n-1}+C_{n-1}\\ (10)\ C_n=C_{n-1}-N'_{n9} & (12)\ N'_n=N_{n-1}-S_n\end{array}\right\}\Delta\theta>0$$

$$\left.\begin{array}{ll}(13)\ S_n=S_{n-1}-M'_{n9} & (15)\ M'_n=M_{n-1}-C_n\\ (14)\ C_n=C_{n-1}+N'_{n9} & (16)\ N'=N_{n-1}+S_{n-1}\end{array}\right\}\Delta\theta<0$$

The terms $M'_n$ and $N'_n$ appearing in Equations 11, 12, 15, and 16 are numbers containing one more digit ($M'_{n9}$ and $N'_{n9}$, respectively) in their binary representations than $M_n$ and $N_n$. This extra digit appears before the most significant digit of $M_n$ and $N_n$; that is:

$$M'_n=M_n+M'_{n9}$$
$$N'_n=N_n+N'_{n9}$$

In other words, the S, C, N, and M numbers each contain nine significant digits (keeping in mind that the tenth digit of the sine and cosine numbers, $S_9$ and $C_9$, respectively, are always zero as previously explained). The N′ and M′ numbers each contain ten significant digits, the first nine least significant digits of which correspond to the nine significant digits of the N and M numbers while the tenth significant digits $M'_9$ and $N'_9$, respectively, represent the overflow signals of the N and M registers which are stored in time intervals 39 and 40 of the diagram $T_n$ of FIG. 5.

Uniform subscript symbols are used in Equations 9 to 16. In Equation 9, for example, the statement is that the value of the sine in the $n^{th}$ cycle of numbers ($S_n$) is equal to the value of the sine in the preceding cycle ($S_{n-1}$) plus the value of the most significant digit of the number contained in the M register in the same $n^{th}$ cycle ($M'_{n9}$). Formulas 9 to 12 apply in the case of positive increments of $\Delta\theta$ in the first and third quadrants or negative increments in the second and fourth quadrants. Formulas 13 to 16 apply in the case of positive $\Delta\theta$ increments in the second and fourth quadrants or negative increments in the first and third quadrants.

Formulas 9 to 16 predict a completely reversible Digital Resolver System. This can be demonstrated by reference to Table 1 in which the case of three digit numbers is used for the sake of simplicity and clarity.

*Table 1*

| | M | Sine | N | Cosine | M | Sine | N | Cosine |
|---|---|---|---|---|---|---|---|---|
| | 0 | 5 | 5 | 5 | | | | |
| | Initial Values | | | | | | | |
| (1)+Δθ | 5 | 5 | 0 | 5 | 2 | 4 | 2 | 6 |
| (2)+Δθ | 2 | 6 | 2 | 4 | 0 | 5 | 5 | 5 |
| (3)+Δθ | 6 | 6 | 4 | 3 | 5 | 5 | 0 | 5 |
| (4)+Δθ | 1 | 7 | 5 | 2 | 2 | 6 | 2 | 4 |
| (5)+Δθ | 3 | 7 | 6 | 1 | 6 | 6 | 4 | 3 |
| (6)+Δθ | 4 | 7 | 7 | 0 | 1 | 7 | 5 | 2 |
| | | | | | 3 | 7 | 6 | 1 |

The left half of Table 1 shows the numbers that successively appear in a Digital Resolver as predicted by Formulas 9 to 16 after each positive increment of $\Delta\theta$ as $\theta$ increases from 45° to 90°. The initial values of 0, 5, 5, and 5 represent the values contained in the M, sine, N, and cosine registers (corresponding to $\theta=45°$) prior to the appearance of the first positive $\Delta\theta$ increment signal. Each row of numbers represents the value of the contemporaneously existing numbers contained in the M, sine, N, and cosine registers which result from a corresponding $\Delta\theta$ signal.

The right half of Table 1 shows the numbers that would appear as predicted by Formulas 9 to 16 if after any one of the positive $\Delta\theta$ increment signals the sense of the $\Delta\theta$ increment is reversed and negative $\Delta\theta$ increment signals are produced. It can be seen that in every case the numbers contained in the right half of Table 1 are duplicates of the numbers two rows above in the left half of the table. This illustrates that the resolver retraces its steps irrespective of the point of reversal.

For example, consider the numbers 6, 6, 4, and 3 which appear in the M, sine, N, and cosine registers, respectively, following the third positive $\Delta\theta$ signal. Let it be assumed that a fourth positive $\Delta\theta$ signal is received in turn producing the numbers 1, 7, 5, and 2. If the sense of the $\Delta\theta$ increment should now be reversed, the numbers 1, 7, 5, and 2 revert as shown in the next succeeding row of the right half of Table 1 to the preexisting values 6, 6, 4, and 3. Thus, the table illustrates, for example, that if one positive and one negative $\Delta\theta$ signal is successively received following the establishment of the numbers 6, 6, 4, and 3, the same numbers will be re-established in their respective registers.

It will be seen that the apparatus of FIG. 4 is a true mechanization of the Formulas 9–16. In this connection, the operation of the digital resolver of FIG. 4, following an increment of the angle $\theta$ in the first quadrant, will be described in detail. Each increment of the angle $\theta$ requires three complete cycles of the recirculation loop, or 120 pulse time intervals for the case considered, to process the data that $\theta$ has changed. In the first of these cycles, the value of $C_{n-1}$ is added to the value of $M_{n-1}$ and the value $S_{n-1}$ is subtracted from the value of $M_{n-1}$ if $\theta$ is increased. At the end of these processes, the M register may overflow putting a digit into the $M'_9$ (40th) pulse position. The N register may also overflow negatively putting a digit into the $N'_9$ (39th) pulse position. During the succeeding one of the aforementioned three cycles, the digit in the M register is added as a least significant digit into the sine number increasing said number by one increment. The digit in N is subtracted from the least significant digit of the cosine number decreasing said number by one increment.

This can be seen by reference to FIG. 4 and to waveform $T_{39}$, for example, of FIG. 5. Waveform $T_{39}$ occurs synchronously with the signal occupying time position 39 in diagram $T_n$. Said signal and waveform $T_{39}$ are applied to AND gate 67 whose output is directed via three-unit delay 73 and OR gate 75 to the input of adder-subtracter 59. It can be seen by reference to time diagram $T_n$ that if the signal $N_9$ is delayed three-time units, it will appear at the input of adder-subtracter 59 simultaneously with the occurrence of the signal representing the least significant digit of the cosine number, which signal occurs in time interval 2.

In order to comply with Formula 12, for example, the value of $S_n$ is to be subtracted from the value of $N_{n-1}$. Instead, the value of $S_{n-1}$ was subtracted. However, if there was a digit in $M'_9$ during the $(n-1)^{th}$ cycle, the value of $S_n$ is one increment greater than the value of $S_{n-1}$. Therefore, if the digit of $M'_9$ is subtracted in the second of the aforementioned two processing cycles from the number in the N register in the first of said two cycles, it will be the same as if the value of $S_n$ had been subtracted from $N_{n-1}$ in the first of the processing cycles. The crossfeed in this case feeds the digit in $M'_9$ so that it may be subtracted from the number in the N register.

This may be seen by noting that the output of AND gate 66, at which the signal representing the digit $M'_9$ appears, is applied via three-unit delay 72, AND gate 76 and OR gate 75 to the input of adder-subtracter 59. By delaying the digit $M'_9$ three time intervals, it appears at the input of adder-subtracter 59 simultaneously with the least significant digit $N_0$ of the number stored in the N register. In this illustrative case, the formulas have been fulfilled rendering the resolver reversible. For a decreasing incremental value in the first or third quadrants, the crossfeed does not go from the $M'_9$ digit to the N register but rather the $N'_9$ digit is added to the M register. In this connection, it will be observed that either of AND gates 76 and 77 will tend to conduct at a given time depending upon the presence or absence of a signal from inverter 128, controlled by the signal on lead 98 at the output of polarity converter 85. This signal is such that gate 76 will conduct for positive $\Delta\theta$ in the first and third quadrants and for negative $\Delta\theta$ in the second and fourth quadrants. Similarly, gate 77 will conduct for the opposite conditions.

When the digit $M'_9$ or $N'_9$ has been used for the carry and the crossfeeds in the second of said processing cycles, it is blocked form reentering the recirculating loop so that it will not appear in any succeeding cycle thereof. The blocking of the $M_9$ and $N_9$ digits is accomplished by the operation of AND gate 60 which is connected in series with the recirculating loop. AND gate 60 is adapted to receive three inputs one of which is derived from the recirculating signal output of adder-substracter 59. Said recirculating signal is passed by AND gate 60 in the simultaneous presence of waveforms $\overline{T}_{39}$ and $\overline{T}_{40}$, which waveforms represent the NOT of waveforms $T_{39}$ and $T_{40}$ of FIG. 5. Waveforms $\overline{T}_{39}$ and $\overline{T}_{40}$ are derived from waveforms $T_{39}$ and $T_{40}$ by the respective actions of inverters 99 and 100 which are respectively adapted to receive the $T_{39}$ and $T_{40}$ outputs from timing pulse source 70. By reference to FIG. 5, it can be seen that AND gate 60 is rendered conductive only during time periods 1–38 inclusive and is non-conductive during time intervals 39 and 40 of time diagram $T_n$ of FIG. 5.

The $W_n$ signal, produced at the output of synchronizer 90, controls the operation of polarity converter 85 and thus the operations of adder-subtracter 59 in the manner previously described. In accordance with the above description, the $W_n$ signal must persist for at least three complete cycles of forty time intervals each, following the $\Delta\theta_n$ pulse at the output of synchronizer 90, because the crossfeed from $M'_9$ to the N register, for example, may cause the N register to overflow and an additional cycle is required to process the borrow from the N register into the cosine register. In the operation of synchronizer 90, the output signal $W_n$ persists until the subsequent occurrence of a $\Delta\theta$ pulse of an opposite sense to the sense of the immediately preceding $\Delta\theta$ pulse which gave rise to the $W_n$ signal.

Timing pulse source 70 of FIG. 4 may comprise a stable oscillator for producing one clock pulse for each of the intervals of waveform $T_n$ of FIG. 5. Additionally, it produces in a conventional manner pulse trains of uniform repetition rate subharmonically related to the basic clock pulse rate. The subharmonic pulse trains are illustrated in FIG. 5.

Initial conditions register 93, in a representative case, may consist of a binary shifting register whose individual stages are placed in states of conduction conforming to the initial values of S, C, M, and N to be placed into the recirculating delay line of FIG. 4. The information thus initially stored in register 93 is shifted out at the clock pulse rate and is applied via lead 95 to OR gate 62 during the time that AND gate 61 is rendered nonconductive by the cessation of a signal on lead 94 as previously explained.

The details of an illustrative embodiment of polarity converter 85 are shown in the functional block diagram of FIG. 6. An understanding of the operation of the converter may be facilitated by reference to Table II in conjunction with the following explanation:

*Table II*

| Angle | Sine | Cosine | $P_s$ | $P_c$ | P at $T_1$, $T_2$, $T_3$, $T_4$ | |
|---|---|---|---|---|---|---|
| | | | | | Increasing $\theta$ | Decreasing $\theta$ |
| First Quadrant | + | + | 0 | 0 | 1 0 0 1 | 0 1 1 0 |
| Second Quadrant | + | − | 0 | 1 | 0 1 1 0 | 1 0 0 1 |
| Third Quadrant | − | − | 1 | 1 | 1 0 0 1 | 0 1 1 0 |
| Fourth Quadrant | − | + | 1 | 0 | 0 1 1 0 | 1 0 0 1 |

The operation of repeater 100 is initiated by timing pulse $T_{39}$. This pulse enters OR gate 104, is delayed one digit time in delay 101, and is utilized as one input to AND gate 102. The other input of AND gate 102 is derived from the output of inverter 103. The $T_{39}$ pulse will continue to recirculate in repeater 100 as long as the sine input to inverter 103 is zero. The recirculating pulse is available at the input to AND gate 105, said gate having two other inputs necessary to produce an output. An input signal on lead 106 is generated at the output of inverter 161 whenever the $P_s$ and $P_c$ polarities are the same, i.e., when $P_s$ and $P_c$ are both plus or both minus, and when the W signal (representing increasing $\theta$) is not present. The last remaining input to AND gate 105 is pulse $T_{38}$ which occurs during the next succeeding 38th time interval following the occurrence of the initiating $T_{39}$ pulse which is applied to OR gate 104.

When the signal at the input of one unit delay 101 and the signal on lead 106 are both present at the time of occurrence of pulse $T_{38}$, gate 105 produces an output pulse causing the lead 108 to be energized. It should be noted that a signal will be present at the input of delay 101 at the time of the $T_{38}$ pulse in the sole event that all the digits of the sine number are zeroes indicating that the value of the sine is zero. The pulse on lead 108 is passed by OR gate 109 and is applied to the input of inverter 110.

It will be seen that inverter 113, delay 115, OR gate 118, AND gate 116, OR gate 109, delay 111, delay 112, and inverter 110 together comprise a dynamic multivibrator which responds to a trigger input by reversing its preexisting state and is adapted to produce two output signals of opposite sense representing the present state. The trigger input corresponds to lead 108 while the two output terminals correspond to leads 119 and 117, respectively. If the multivibrator is in state "1," a succession of pulses at the frequency of source 70 of FIG. 4 will be generated on lead 119 with no signal being present on lead 117. If the multivibrator is in state "0," on the other hand, a signal will be present on lead 117 but not on lead 119.

To exemplify the operation of the multivibrator, let it be presumed that at time interval $T_{37}$ no signal is present on lead 119 and that during the next succeeding time interval, $T_{38}$, a pulse appears at the output of gate 105. Inasmuch as no signal appeared during interval $T_{37}$ at the input of inverter 110 (lead 119), a signal was generated at the output of inverter 110 which is delayed two digit intervals by delay 112 and applied via OR gate 118 to one of the inputs of AND gate 116. Said two digit delayed signal appears at the input of gate 116 during time interval $T_{39}$.

The pulse produced at the output of gate 105 at time interval $T_{38}$ is directly applied to OR gate 109, placing a pulse on lead 119 and causing a cessation of an output signal from inverter 110. The pulse on lead 119 is delayed one digit time in delay 111 and is consequently applied to AND gate 116 during the same time interval $T_{39}$ that the two digit delayed pulse is passed by delay 112.

A third input to gate 116 is a succession of pulses at the repetition rate of source 70 which is applied by the input lead designated $I_1$ to initially set the polarity signal $P_s$ to "0." Upon the simultaneous satisfaction of the three conduction requirements of gate 116, a pulse is generated at the output thereof during time interval $T_{39}$. This pulse is passed by OR gate 109 and is delayed one digit time by delay 111 and reapplied to the input of gate 116.

No pulse occurs at the output of gate 105 during time intervals $T_{39}$ through $T_{37}$ inclusive. Therefore, the absence of a signal at the output of gate 105 during time interval $T_{39}$ produces a signal at the output of inverter 113 during the same time interval, which signal is delayed one digit time by delay 115. The one digit delayed pulse is applied by OR gate 118 to gate 116 during the same time interval $T_{40}$ as the pulse which passed through delay 111. Thus, the multivibrator whose initial condition, as represented by no signal on lead 119 and the presence of a signal on lead 117, has been shown to reverse in response to a single input pulse appearing at the output of gate 105.

The multivibrator is caused to revert to its initial condition upon the next appearance of an output pulse from gate 105. Said output pulse is applied to inverter 113 causing the appearance of a zero signal on lead 114 during time interval $T_{38}$. Thus, no input pulse occurs at the lowest input terminal of AND gate 116 during time interval $T_{39}$, and the recycling one digit delay loop is broken.

The same analysis of operation is equally applicable for the output signals which are generated in response to the $I_2$ and C inputs. The corresponding output terminals 119, 150, and 117, 151 are applied to respective AND gates 152 and 153. AND gate 152 will be rendered conductive in the sole event that the polarity of the sine and cosine are both negative (Table II) while AND gate 153 will conduct when the polarities of the sine and cosine are both positive. Thus, a signal is produced at the output of OR gate 154 when the polarities of the sine and cosine are the same. No signal will be generated at the output of inverter 155 in this case. On the other hand, in the event that the polarities of the sine and cosine are dissimilar, no signal will appear at the output of OR gate 154 but a signal will be present at the output of inverter 155.

If $\theta$ is increasing, a pulse will be produced on lead 121; if $\theta$ is decreasing, a pulse will be produced on lead 122. As previously discussed, a signal appears on lead 156 when the polarities of the sine and cosine are unlike while a signal appears on lead 157 when the polarities are the same. Consequently, AND gate 158 conducts when the polarities of the sine and cosine are the same and when the angle $\theta$ is increasing, while gate 159 conducts when the polarities of the sine and cosine are unlike and the angle $\theta$ is decreasing.

It will be observed that a change in polarity of the sine, for example, is required when the angle $\theta$ increases through the fourth quadrant, reaches zero (360°), and continues into the first quadrant. The same requirement exists when the angle $\theta$ is increasing in the second quadrant, reaches 180°, and continues into the third quadrant. In both these cases, no pulse will be produced at the output of gate 107 causing the inverter 161 to put a pulse on lead 106. In similar fashion, no pulse will be produced at the output of gate 107 when the angle $\theta$ is decreasing in the third quadrant, goes through 180°, and enters the second quadrant, or when the angle $\theta$ is decreasing in the first quadrant, goes through zero, and enters the fourth quadrant.

The feedback leads 106 and 120 insure that the pulses representing the polarities of the sine and cosine appearing on leads $P_s$ and $P_c$, respectively, will not change unless such a quadrant boundary is traversed as requires the change. When the boundaries between the first and fourth and between the second and third quadrants are being traversed, lead 106 is energized. Similarly, when the boundaries between the first and second and between the third and fourth quadrants are being traversed, lead 120 is energized. The signals on lead 106 are applied to a first input of AND gate 126, while the signals on lead 120 are applied to a first input of AND gate 123. Timing waveforms $T_s$ and $T_4$ are applied to OR gate 124; timing waveforms $T_c$ and $T_3$ are applied to OR gate 160.

Consequently, if the polarities of the sine and cosine are alike and the angle $\theta$ is increasing, or if the polarities of the sine and cosine are unlike and the angle $\theta$ is decreasing, there will be produced at the output of AND gate 123 (and therefore on output lead 98) a continuous succession of four pulses as represented in Table II by the first and third rows of the column designated "Increasing $\theta$" and by the second and fourth rows of the column designated "Decreasing $\theta$". It will be seen that when said continuous succession of pulses is applied via lead 98 to adder-subtracter 59 of FIG. 4, the operations formed therein succesively will be addition, subtraction, subtraction and addition during each group of four time intervals of diagram $T_n$ of FIG. 5. The result is that the sine and M registers will operate in the additive sense while the cosine and N registers will operate in the subtractive sense.

In the event that the polarities of the sine and cosine are the same while the angle $\theta$ is decreasing or should the polarities of the sine and cosine be unlike while the angle $\theta$ is increasing, then neither gate 158 nor gate 159 will conduct. The absence of a signal output from OR gate 107 in this case will result in a signal being produced at the output of inverter 161. Consequently, a continuous succession of four pulses represented by the notation 0110 will appear at the output of gate 126 and on lead 98.

Figure 7:
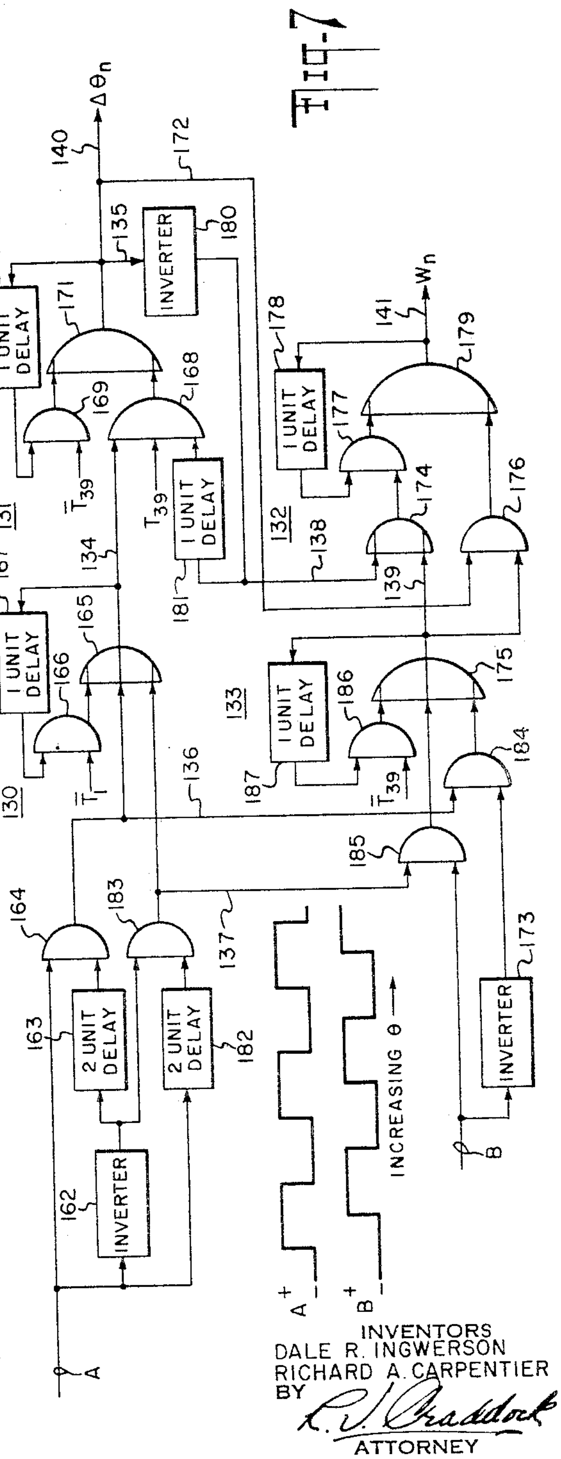
FIG. 7 is an illustrative embodiment of the synchronizer of FIG. 4.
Figure 5:
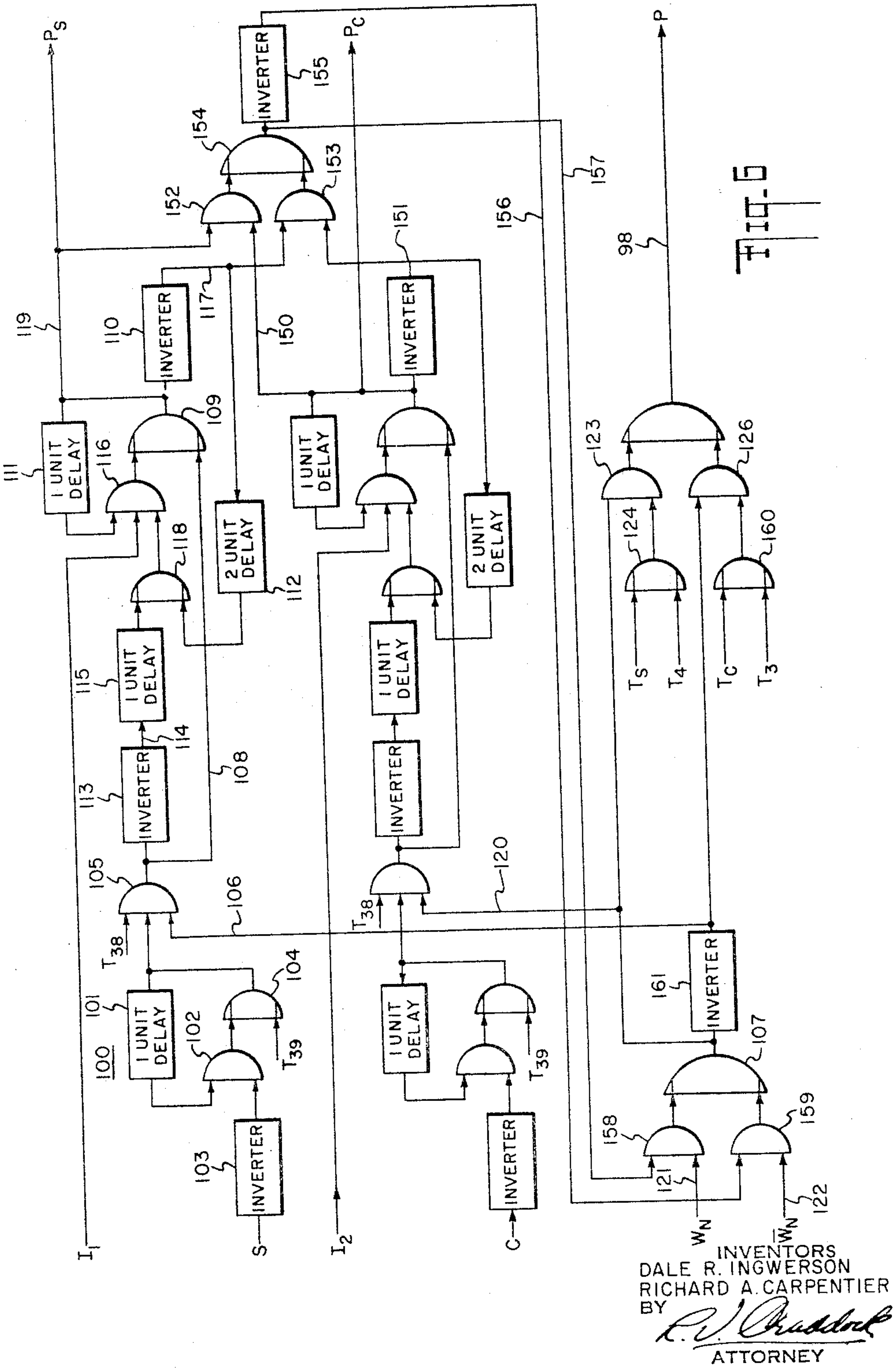

FIG. 7 illustrates a simplified synchronizer 90 for use in the resolver of FIG. 4. Synchronizer 90 accepts the incremental input waveform A and the sense input waveform B, both of which may change polarity at random times, and produces therefrom the respective outputs $\Delta\theta_n$ and $W_n$ synchronized with the timing source.

Repeater 130, formed by OR gate 165, AND gate 166, and one unit delay 167 is triggered into operation whenever the polarity of waveform A changes. This is accomplished by the circuit comprising inverter 162, two unit delays 163 and 182, and AND gates 164 and 183. When A is negative, the upper input to gate 164 is negative causing it to be non-conductive. The lower input to gate 164 is positive because it is driven through delay 163 by the output of inverter 162. When A changes to positive polarity, the upper input of gate 164 becomes positive. The lower input is still positive because the two unit delay 163 prevents the changed polarity waveform A from being transmitted therethrough for two digit time intervals. Therefore, gate 164 conducts for two time periods and then becomes non-conductive when the lower input to gate 164 becomes negative. When A becomes negative, the upper input to gate 164 is negative before the lower input therethrough becomes positive, preventing the conduction of gate 164. Gate 183 conducts for two time periods when A changes from positive to negative in the same manner as gate 164 conducts in the case of the opposite change.

The two time period pulses at the output of AND gate 164 or AND gate 183 (as the case may be) enters OR gate 165 and is recirculated back into OR gate 165 via one unit delay 167 and AND gate 166. Gate 166 is conductive except during the first period of each cycle at which timing signal $\overline{T}_1$ is not present. Thus, repeater to 130, having been previously turned on by an output pulse from either of the AND gates 164 or 183, will be turned off during the next succeeding first time interval $T_1$. Prior to the turning off of repeater 130, its output on lead 134 turns on repeater 131 during time interval 39. Repeater 131, composed of AND gates 168 and 169, OR gate 171 and delay 170, generates the synchronized output signal $\Delta\theta_n$ for one complete timing cycle. Repeater 131 is turned off in the absence of the $T_{39}$ signal at the input to gate 169 during the next succeeding 39th time interval.

Should the signal A change state at or near time interval 39 (producing a pulse on lead 134) repeater 131 would remain on for two complete timing cycles. A blocking circuit composed of inverter 180 and one unit delay 181 is employed to preclude such operation of repeater 131 by preventing repeater 130 from being read into repeater 131 if repeater 131 were operating during the previous timing cycle. The blocking circuit responds to the presence of an output $\Delta\theta_n$ pulse on lead 135 during time interval 38 to render gate 168 non-conducting during the 39th time interval in such a case.

As previously stated, input waveform B indicates the direction of shaft rotation of digitizer 91 associated with the incremental change $\Delta\theta$. From the waveform diagram of FIG. 7, it can be seen that B is negative when A changes from negative to positive and positive when A changes from positive to negative if $\theta$ is increasing. Similarly, B is positive when A changes from negative to positive and negative when A changes from positive to negative in the event that $\theta$ is decreasing.

OR gates 174 and 179, AND gates 176 and 177 and one unit delay 178 form repeater 132. The operation of repeater 132 can be changed only in the presence of an output $\Delta\theta_n$ pulse on lead 172 which indicates that the sense of $\theta$ has changed. AND gates 184, 185, and 186, OR gate 175, and one unit delay 187 form repeater 133 which is turned on whenever an increment of $\Delta\theta$ is received via leads 136 or 137 at a time when B is of the required polarity for increasing angles. Repeater 133 is turned off in the 39th time interval by $\overline{T}_{39}$ which is applied to one of the inputs of AND gate 186.

In the event that repeater 133 is on at the same time that a $\Delta\theta_n$ signal appears on lead 172, AND gate 176 conducts, turning on repeater 132. If repeater 132 was already on, it remains in that condition. Should repeater 133 be off when there is a signal $\Delta\theta_n$ on lead 172, gate 176 is rendered non-conducting. Gate 174 is also non-conducting in this case because of the absence of signals on either of leads 138 and 139. Under this set of conditions, AND gate 177 is rendered non-conducting interrupting the feedback from lead 178 causing the signal $W_n$ to cease.

In summary, a sequence of $\Delta\theta_n$ pulses, each occurring synchronously with a respective one of the clock pulses at the output of timing pulse source 70 of FIG. 4 is produced on output lead 140 in response to each change in polarity of input waveform A of FIG. 7. The sequence of $\Delta\theta_n$ pulses persists for one complete timing interval, i.e., for one complete cycle around the recirculating delay loop of FIG. 4. A $W_n$ signal is produced on output lead 141 in the presence of a displacement of input shaft 64 of FIG. 4 indicating increasing $\theta$. The $W_n$ signal persists until the sense of displacement of input shaft 64 of FIG. 4 reverses indicating decreasing $\theta$.

From the preceding specification, it can be seen that the objects of the present invention have been achieved by the provision of four registers preferably of equal numerical capacity. The registers are connected in pairs in accordance with FIG. 2 and the paired registers are cross-connected in accordance with FIG. 1 so as to produce, in response to pulses representing incremental changes in the displacement of input shaft relative to a reference position, a pair of output signals respectively representing the sine and cosine of the angle through which the input shaft has been displaced relative to its reference position. Provision is made for eliminating the cumulative error which would otherwise arise upon reversal of the sense of displacement of the input shaft by means of selectively cross-connecting two of said four registers such that the overflow pulse from one of said cross-connected registers is applied to the least significant digit of the other register, and vice versa. The remaining two of the four registers, other than the pair which are cross-connected for purposes of eliminating the reversal error, store signals respectively representing the value of the sine and cosine of the input shaft displacement angle.

In the preferred embodiment of the present invention, disclosed in FIG. 4, serial digital techniques are utilized so as to facilitate the time-sharing of a common computer element which performs the function of each of the four basic registers comprising the digital resolver. It will be seen that while the preferred embodiment of the present invention, illustrated in FIG. 4, employs such time-sharing and serial digital computation techniques, the present invention is not limited thereto, but may be readily adapted by the utilization of knowledge and skills available in the art to other embodiments more closely resembling the parallel-operated computer components of FIG. 2 wherein no time-sharing is utilized.

It should also be noted that the apparatus generally represented by the functional block diagrams of FIGS. 4, 6, and 7 is readily suited to conventional pulse technique instrumentation including magnetic drums, mercury, quartz or electromagnetic delay lines for storage and magnetic, electron tube, or transistor computing elements.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A reversible digital resolver comprising first, second, third, and fourth digital signal storage means for respectively storing first, second, third and fourth digital signals, each said digital signal representing the value of a respective digital number, means for combining the digital signals stored in said first and second storage means with the digital signals stored in said third and fourth storage means respectively, so as to algebraically combine the digital numbers respectively represented thereby, said means for combining becoming operative upon the occurrence of a first control signal, means for generating fifth and sixth signals when the capacity of said third and fourth storage means, respectively, is exceeded, means for applying said fifth signal to the least significant digit place of said second storage means, for applying said sixth signal to the least significant digit place of said first storage means, first means for selectively applying when actuated said fifth signal to the least significant digit place of said fourth storage means, second means for selectively applying when actuated said sixth signal to the least significant digit place of said third storage means, means for actuating only one of said first and second selectively applying means at a time in response to a second control signal, and means for reversing the sense of operation of each of said storage means in response to said second control signal.

2. A reversible digital resolver comprising first, second, third and fourth digital signal storage means for respectively storing first, second, third and fourth digital signals, each said digital signal representing the value of a respective digital number, means for combining the digital signals stored in said first and second storage means with the digital signals stored in said third and fourth storage means, respectively, so as to algebraically combine the digital numbers respectively represented thereby, said means for combining becoming operative upon the occurrence of a first control signal, means for generating fifth and sixth signals when the capacity of said third and fourth storage means, respectively, is exceeded, means for applying said fifth signal to the least significant digit place of said second storage means, means for applying said sixth signal to the least significant digit place of said first storage means, first means for selectively applying when actuated said fifth signal to the least significant digit place of said fourth storage means, second means for selectively applying when actuated said sixth signal to the least significant digit place of said third storage means, means for actuating only one of said first and second selectively applying means at a time in response to a second control signal, means for reversing the sense of operation of each of said storage means in response to said second control signal, means for generating said second control signal including means for determining the occurrence of a zero value of either of two applied signals and means responsive to a reversal in the sense of an applied signal, means for applying the first and second digital signals stored in said first and second storage means to said means for determining, and means for applying said first control signal to said responsive means.

3. Apparatus as defined in claim 2 wherein said digital signal storage means are contained within a common recirculating delay loop.

4. Apparatus as defined in claim 3 wherein the signals representing corresponding significant digits of the numbers stored in said common delay loop are interleaved in time.

References Cited in the file of this patent

UNITED STATES PATENTS

| | | |
|---|---|---|
| 2,785,855 | Williams et al. | Mar. 19, 1957 |

FOREIGN PATENTS

| | | |
|---|---|---|
| 731,140 | Great Britain | June 1, 1955 |
| 771,388 | Great Britain | Apr. 3, 1957 |